US008077330B2

United States Patent
Klassen et al.

(10) Patent No.: US 8,077,330 B2
(45) Date of Patent: Dec. 13, 2011

(54) PARALLEL RIP WITH PREAMBLE CACHING

(75) Inventors: R. Victor Klassen, Webster, NY (US); Peter A. Crean, Penfield, NY (US); Michael Campanella, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1026 days.

(21) Appl. No.: 11/961,102

(22) Filed: Dec. 20, 2007

(65) Prior Publication Data
US 2009/0161163 A1 Jun. 25, 2009

(51) Int. Cl.
*G06K 15/00* (2006.01)

(52) U.S. Cl. ........................ 358/1.13; 358/1.18; 358/1.15

(58) Field of Classification Search ................ 358/1.13, 358/1.15, 1.18
See application file for complete search history.

(56) References Cited

U.S. PATENT DOCUMENTS

| | | | |
|---|---|---|---|
| 5,819,014 A | 10/1998 | Cyr et al. | |
| 6,407,821 B1 * | 6/2002 | Hohensee et al. | ........... 358/1.15 |
| 6,583,890 B1 * | 6/2003 | Mastie et al. | ................ 358/1.18 |
| 6,817,791 B2 | 11/2004 | Klassen | |
| 7,161,705 B2 | 1/2007 | Klassen | |
| 2002/0129066 A1 * | 9/2002 | Milward et al. | ................ 707/523 |
| 2003/0033368 A1 * | 2/2003 | Tominaga | ..................... 709/203 |
| 2004/0196496 A1 | 10/2004 | Klassen | |
| 2004/0196497 A1 * | 10/2004 | Klassen et al. | ............... 358/1.15 |
| 2005/0094191 A1 * | 5/2005 | Vondran et al. | ............... 358/1.15 |
| 2006/0055970 A1 * | 3/2006 | Smith et al. | ................... 358/1.16 |
| 2006/0139679 A1 * | 6/2006 | Barry et al. | .................. 358/1.13 |
| 2006/0192984 A1 * | 8/2006 | Barry et al. | .................... 358/1.9 |

\* cited by examiner

*Primary Examiner* — King Poon
*Assistant Examiner* — Allen H Nguyen
(74) *Attorney, Agent, or Firm* — Oliff & Berridge, PLC

(57) ABSTRACT

A method and system is provided for splitting a print job into its preamble and at least one chunk. The splitter maintains a collection of RIP node addresses to which chunks of the job currently being split have already been sent. When a new chunk is about to be sent, the splitter checks whether each RIP node address has already received a chunk. If the RIP node has not already received a chunk, the splitter sends the preamble as well as the chunk to an available RIP associated with the RIP node. If, however, the RIP node address has already received a chunk, only the portion of the chunk after the preamble is sent to an available RIP associated with the RIP node and communicate the location of the preamble to the available RIP node. The preamble may contain common content for each job.

17 Claims, 5 Drawing Sheets

PARALLEL RIP WITH PREAMBLE CACHING

BACKGROUND

1. Technical Field

The disclosure is directed to printing systems, and, more particularity, processing steps for a print job to split the job into its preamble and chunks to enable a parallel system to process jobs with very large preambles efficiently, thereby avoiding performance and system reliability problems, by eliminating the need to copy, move, or process the large preamble more than once.

2. Description of the Related Art

Generating print-ready documents to be printed by a printing system requires acquiring all the information (content, graphics, production specs, etc.) required to view, process and output the desired document in an electronic form understandable by a print engine. Such systems can range from those that are simple and modestly expensive, such as are known to consumer users of personal computer systems, up to commercial printing systems that are capable of generating in the range of hundreds or even thousands of pages per minute in full color. All systems, though, have a high level objective of printing faster.

There are three general approaches which have been applied in the past for accomplishing this objective. First, faster serial processing methods suggest optimizing the software and using faster and more expensive processors. Second, job parallel processing sends separate jobs to separate systems and then prints them on a common printer. In such a job parallel processing system, each job (i.e., jobs 1-3) is taken from a queue and handed to a separate RIP processor to be converted in parallel and then output in serial order (job 1, job 2, job 3). Third, Portable Document Format ("PDF") based page or chunk parallel systems convert the job to PDF, and then split the PDF file onto pages or chunks, which are converted to print ready form on multiple independent processors, with the job being printed on a common printer. In a page or "chunk" processing system an individual job is taken from the queue and broken down into pages or other divisible "chunks," with the chunks being sent to multiple RIP processors to be converted in parallel so that individual pages or "chunks" can be output in logical page order (e.g., chunk 1, 2, 3).

Of these general approaches, software optimization has its limits and faster processors are also limited by currently available technology. Job parallel processing may result in poor single job performance, unpredictable job time and reduced throughput when there is only one long job in the queue. The existing third approach (PDF-based solutions) may be slow due to their need to often convert from a different input language into PDF and then write the PDF file into an input spool disk. Between page and chunk parallel systems, page parallel processing has suffered from the inefficiencies of a throughput disadvantage because per job overhead occurs on a per page basis. Thus, "chunk" processing may be the most promising for improvement.

Chunk parallelism is an intermediate level of parallelism between job parallelism and page parallelism. A chunk is a collection of data consisting of at least one page and not more than one job. A chunk may be an integer number of pages less than an entire job but has a startup overhead occurring on a chunk basis as opposed to a per page basis. A more detailed description of "chunk" parallelism can be found in U.S. Pat. Nos. 7,161,705, 6,817,791, U.S. Publication No. 2004/0196497, and U.S. Publication No. 2004/0196496, the disclosures of which are hereby incorporated herein in their entirety, which describe chunk parallelism as an intermediate level of parallelism between job parallelism and page parallelism.

A more detailed description of a job parallel system can be found in U.S. Pat. No. 5,819,014, the disclosure of which is hereby incorporated herein in its entirely, which describes a printer architecture using network resources to create a "distributed" printer controller or translator. By distributing the translators across the network, print jobs may be processed in parallel. Each job is formatted in the system in a particular data type comprising a Page Description Language ("PDl") such as a PostScript file, ASCII, PCL, etc. A distributed set of the translators is used for each data type, the translators each comprising a plurality of CPUs to simultaneously rasterize each data type. In real time operation, each translator on the network can formulate the rasterized image, which is then fed over the network to the print engine. Job parallelism increases the flexibility of the printing system by allowing slow jobs to be processed while quicker jobs are completed and printing. However, it can be easily appreciated that where the jobs require substantially different processing times, waits will necessarily occur and overall system efficiency will suffer.

A known commercially available system exploiting page parallelism is Adobe® Extreme. In this system, the data input for a print job is normalized into a PDF format and stored on disk. The PDF format is essentially page independent guaranteed and thus facilitates segregating the job into page wits for page parallel processing. A "sequencer" processing node takes the PDF jobs off the disk and writes them back onto a disk again a page at a time as individual files, one file per page. Rasterizing Image Processing nodes (RIP nodes) then convert the files into a print-ready form acceptable by a print engine. It is important to note that in terms of processing efficiency, Adobe Extreme must access the disk twice, thus slowing the system down, and that the RIP nodes can only process a file consisting of a single page. Of course, an entire job may be limited to one page, but when a job is comprised of several pages, Adobe Extreme must sequence it to individual pages only.

SUMMARY

Accordingly, in the continuing need for improving efficiency and speed in printing systems, there is a need for a system which is not limited to mere job or page parallelism and that can facilitate control and data flow of a print job to the printing system that will obviate multiple access to a storage disk for any single job. Aspects of the disclosure satisfy these needs and thus overcomes the problems specified above, as well as others.

Some PDLs (Adobe PostScript in particular) define a "preamble" (or prolog) as a segment of PDL code that contains macro definitions, resources, fonts and the like that PDL code for individual pages of the job might reference or reuse. By defining these items once in a preamble and referencing them on subsequent pages of the job file, smaller PDL files can be created. As part of a chunk or page parallel RIP system, the preamble needs to be recognized and prepended to each page or chunk sent to each RIP to enable the individual RIP processes to successfully interpret each page or chunk. However, a problem occurs when a job with a very large preamble (for example, 100 Mb) is encountered. The overhead of reading and wilting this large block of data into each chunk to be processed by the parallel RIPs coupled with the compute cycles required to process the large preamble every time it is encountered may swamp the performance benefits of chunking and processing the job in parallel. One aspect of the disclosure avoids this overhead by sending the preamble to each parallel RIP process once during the life of the job. The RIP processes then "remember" the preamble and reference it as they process the remaining pages or chunks of the job. This technique eliminates all of the overhead associated with handling large preambles multiple times and leads to vastly improved RIP efficiency and performance.

Therefore, one aspect of the disclosure enables a parallel system to process jobs with large preambles efficiently, thereby avoiding the performance and system reliability issues described above. In such a system, a parallel RIP splitter does some book-keeping so as to send the preamble for a given job to each PostScript interpreter process or RIP node exactly once. The splitter can communicate to the RIP process that the chunks to follow should be implicitly pre-pended with this pre-loaded preamble. In an exemplary embodiment, a preamble is deleted from a node when all Rips resident on that node are finished with it. In an alternative embodiment, a RIP would read a preamble only once, and treat subsequent chunks with the same preamble as if they were concatenated segments of the same job. In either embodiment, the net effect is elimination of the need to copy, move, or process the large preamble more than once for each available RIP process over the course of the job.

Exemplary embodiments of the disclosure provide a method for splitting a print job, to be distributed in a parallel RIP system, into a preamble and at least one chunk, wherein the parallel RIP system includes at least one RIP node having at least two RIPS, the preamble for a given job being sent to each RIP node exactly once. The method comprises the steps of: identifying the preamble at the beginning of a job file; splitting the remainder of the job into chunks based on a combination of number of bytes and pages; sending the chunks of the job to a plurality of the RIPs for processing; sending the preamble of the job currently being split to the RIP node assigned to the current job; maintaining a collection of RIP node addresses to which chunks of the job currently being split have already been sent; and checking whether each RIP node address has already received a chunk when a new chunk is about to be sent. During this checking, if the RIP node address has not already received a chunk, the preamble as well as the chunk is sent to an available RIP associated with the RIP node, and if the RIP node has already received a chunk, only the portion of the chunk after the preamble is sent to an available RIP associated with the RIP node and communicating the location of the preamble to the available RIP that is designated to receive the chunk. The location of the preamble is implicit or explicit through a file naming convention.

In accordance with other aspects, exemplary embodiments provide a parallel RIP system comprising: at least one RIP node on at least one physical network-connected computer; at least two RIPs for parallel processing of a print job into a printer-ready format for the printing of a print job; a supervisor for maintaining low bandwidth connections to the other parts of the system and scheduling events; a job manager for communicating status information to the supervisor; and a splitter for splitting the print job into a plurality of chunks. The splitter performs the following: divides the print job into its preamble and at least one chunk; assigns the chunks of the job to a plurality of the RIPs for processing into the printer-ready format and the chunks are split based on a combination of number of bytes and pages; sends the preamble of the job currently being split to the RIP node assigned to the current job only once; maintains a collection of RIP node addresses to which chunks of the jobs currently being split have already been sent; checks whether each RIP node address has already received a chunk when a new chunk is about to be sent, such that when the RIP node address has not already received a chunk, the splitter sends the preamble as well as the chunk to an available RIP associated with the RIP node, and when the RIP node address has already received a chunk, the splitter sends only the portion of the chunk after the preamble to an available RIP associated with the RIP node, and communicates the location of the preamble to the available RIP that is designated to receive the chunk. The location of the preamble is implicit or explicit through a file naming convention. The parallel RIP system described above further may include a collector for serializing chunk complete messages and maintaining a collection of node addresses to which chunks of each job being RIPped have been sent so that triggering the removal of the corresponding preambles when the job completes is possible.

Other advantages and benefits of the embodiments will become apparent to those of ordinary skill in the art upon reading and understanding the following detailed description of the preferred embodiments.

EMBODIMENTS

Embodiments of the disclosure address the continuing need for faster printing systems, particularly systems where every page can be color and different. The system exploits parallelism to facilitate its speed. The subject disclosure may use an intermediate level of parallelism known in the field as "chunk" parallelism, but may equally be applied to page parallelism. These parallel processing systems are improved to efficiently handle large "preambles."

Figure 3:
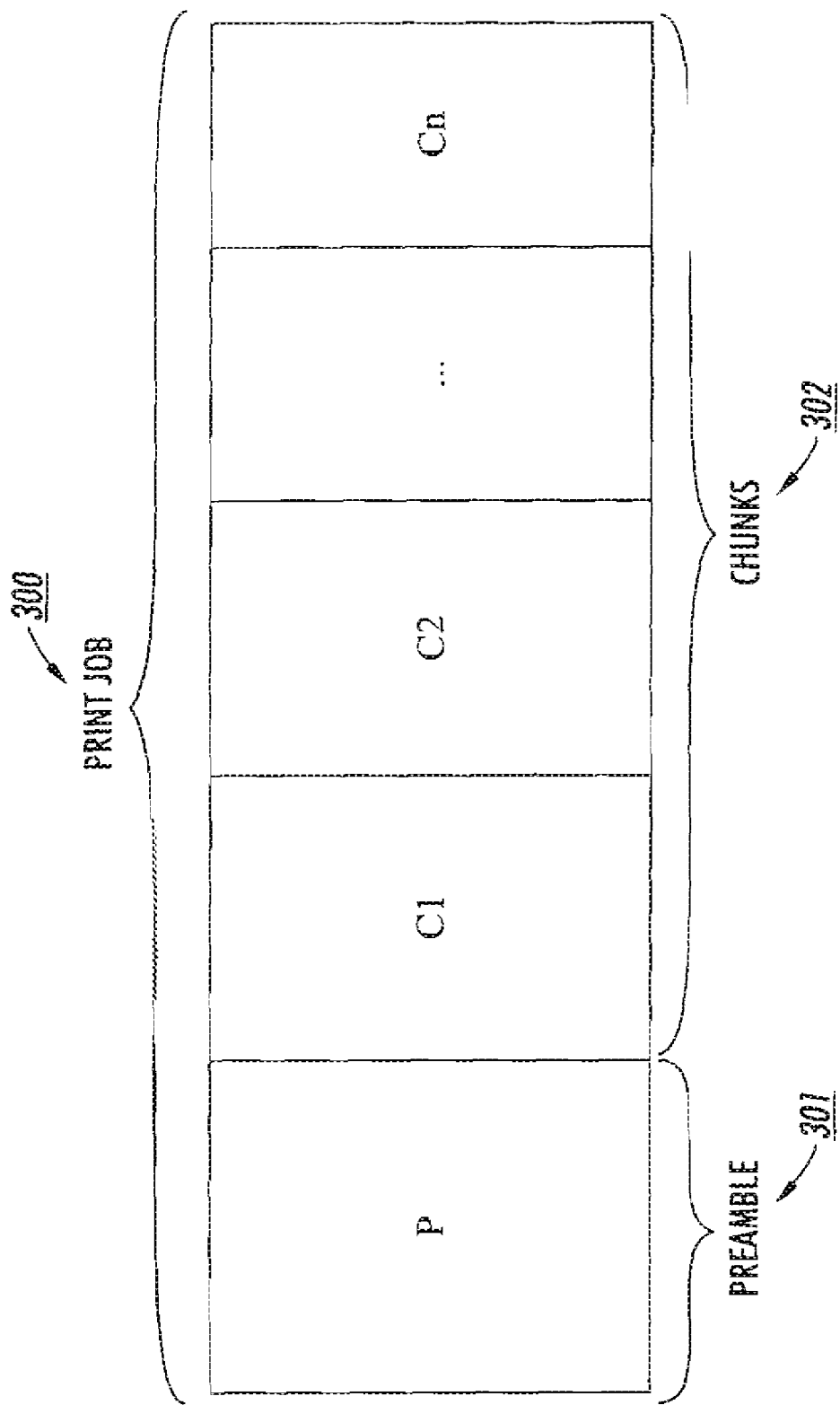
FIG. 3 is a schematic representation of a print job fore showing the preamble and possible chunks.

With particular reference FIG. 3, it can be seen that a particular print job 300 is split into its preamble 301 and at least one chunk 302 for rasterizing by an assigned RIP node as will hereinafter be more fully explained. While the term preamble, as generally known, refers to a section at the beginning of a document, prior to the main content, the concept, as used here may be more general. Document Structuring Convention conformant PostScript (DSC-PS), being used as the primary example, has all of its common content at the start of the file; however other languages, such as Adobe's Portable Document Format (PDF), have common content in other portions of the file. An aspect of the disclosure is to minimize transmission and possibly storage and processing of common content, whether or not it appears at the "start" of a file or elsewhere. A preamble as found in DSC-PS is an example of such common content. Therefore, "preamble" as used herein is intended to encompass such common content among the "chunks."

Figure 4:
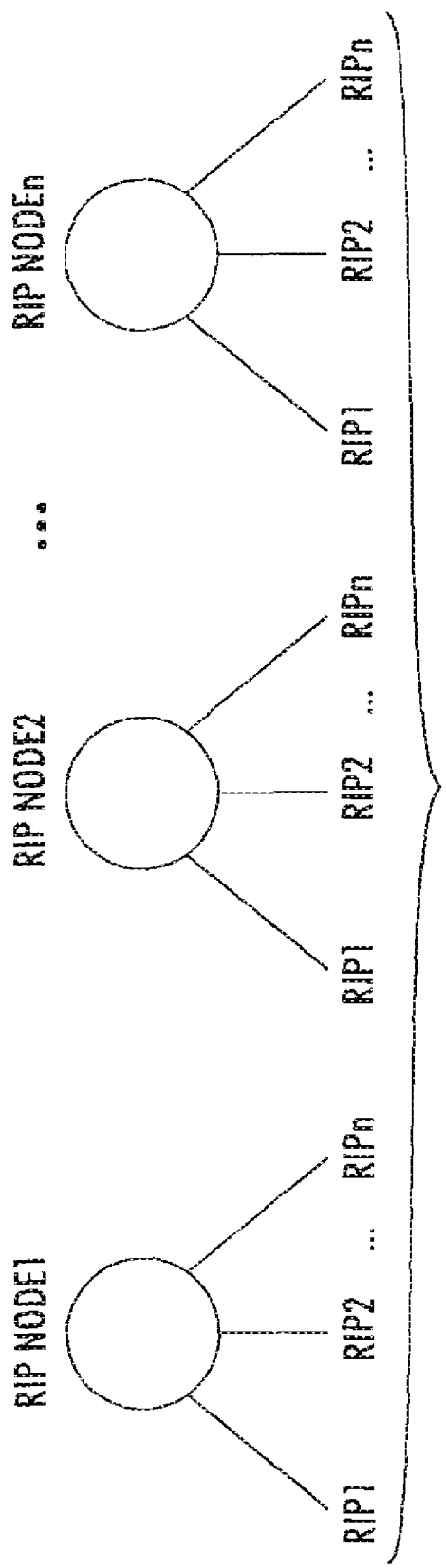
FIG. 4 is a schematic representation of a plurality of RIP nodes and the plurality of RIPs associated with each RIP node.

With particular reference FIG. 4, a splitter sends chunks to various RIP nodes for processing, each RIP node comprising at least one RIP. When a new print job is received, the splitter splits the print job into its preamble and at least one chunk. The preamble is sent to a RI node assigned to the print job only once. Subsequently, the chunks belonging to the same print job are sent to the RIPs belonging to the RIP node where the preamble has been sent. A chunk and a preamble address is sent to the RIP so that the RIP can locate the preamble for that particular chunk without having to receive and process the preamble itself.

Figure 1:
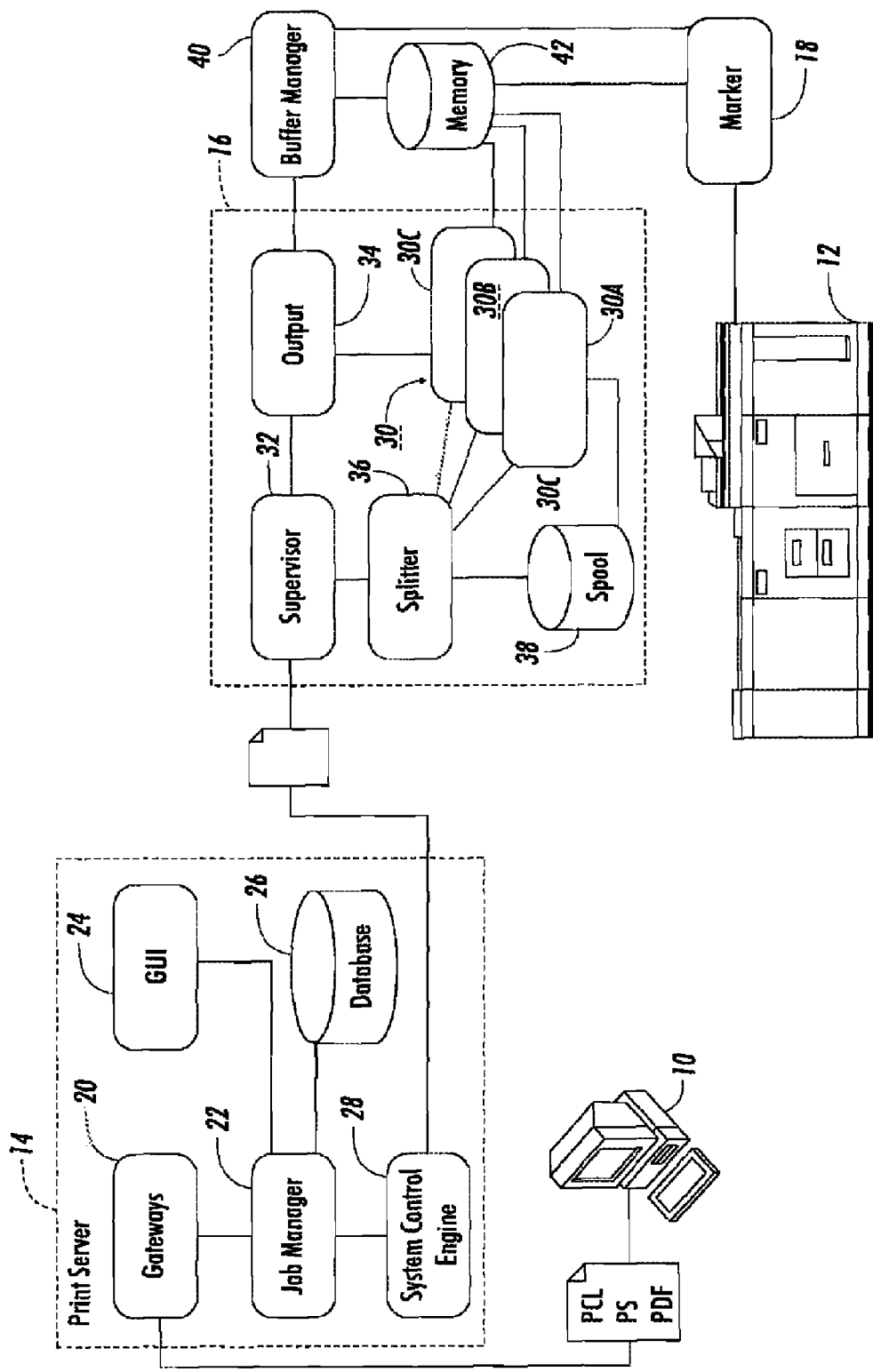
FIG. 1 is a high-level system view of a printing system incorporating a preamble caching feature of the embodiments.
Figure 2:
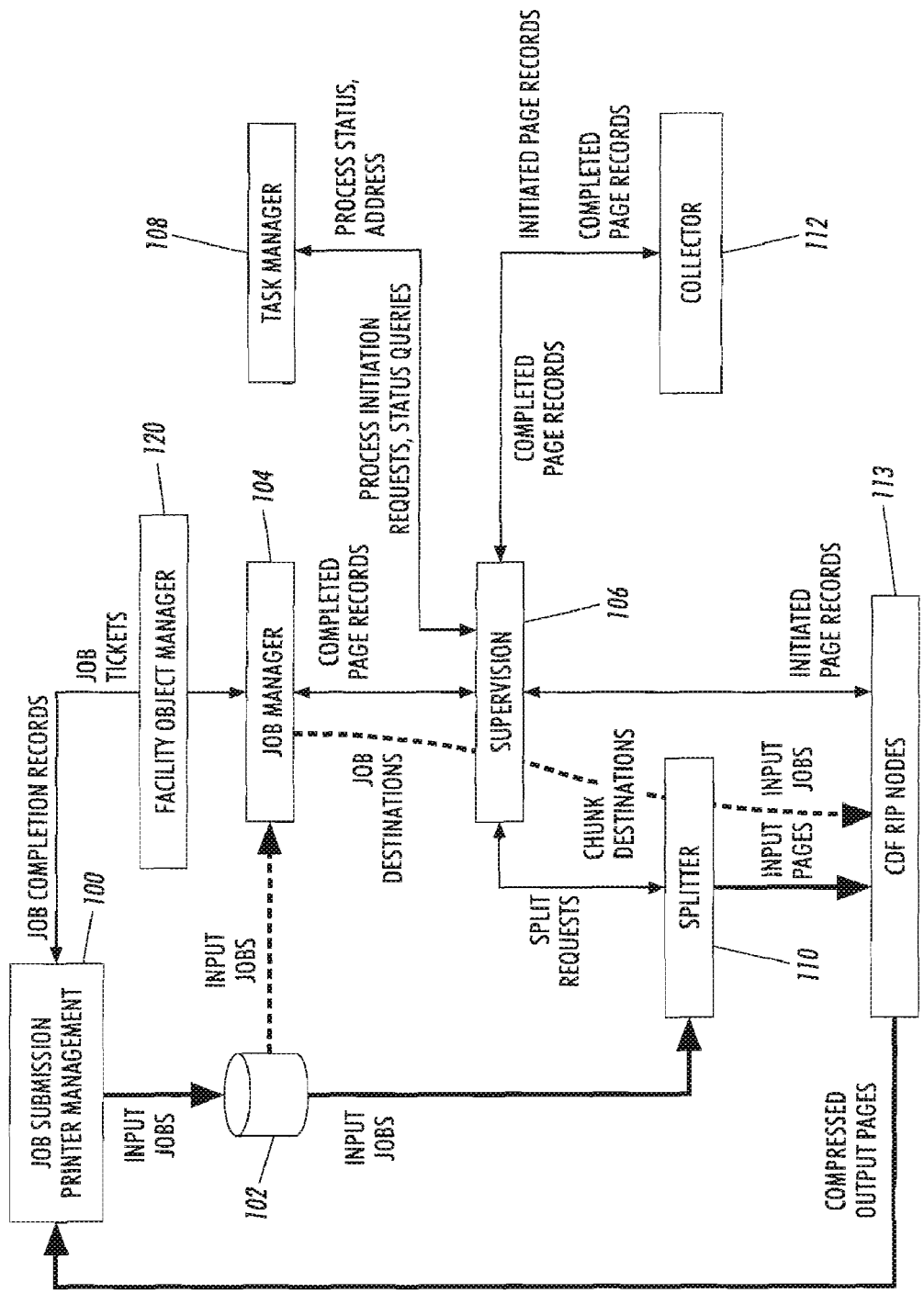
FIG. 2 is a block diagram illustrating the architecture for control and data flow of the printing system of FIG. 1.

With particular references to FIGS. 1 and 2, a chunk parallel page rasterization system is illustrated having the ability to improve usage of preamble information. The system may be implemented as a distributed system, or a centralized service on a single multiprocessor machine, for driving a printing apparatus.

FIG. 1 is a high-level system view of an exemplary printing system. While the below description of a preferred embodiment is applicable to a commercially-available product, Xerox DocuSP, it will be appreciated that the disclosure shall not be limited to such a specific implementation. In particular, the method of the invention could be used in a modified Adobe Extreme type system, accelerating page parallel processing.

Jobs comprising image data to be printed are submitted from a job submission client 10, which could be any of a large number of computers on a network (not shown). The jobs from the client 10 are ultimately intended to be printed on a high-speed digital printing apparatus 12. Interposed between the client 10 and the printing apparatus 12 is a print server indicated as 14, one or more parallel RIP subsystems generally indicated as 16, a buffer manager 40 and a marker 18. Print server 14 may include certain elements of the commercially-available DocuSP. Buffer manager 40 collects the image data from subsystem 16 until marker 18 is ready. Marker 18 is intended to represent the software, which is directly operative of the printing apparatus 12, which provides hardcopy output images.

Turning first to print server 14, jobs submitted from client 10 pass through a gateway 20, which interacts with a job manager 22. The job manager 22 is the interface of the print server to the user, and would typically be apparent to the user through a screen on the client's computer, as indicated by graphical user interface (GUI) 24. The job manager 22 also interfaces with a database 26 which includes software that would, for example, enable the client to select, for example stapling, duplex, output, and other options. The job manager 22 further interfaces with a system control engine 28, which directs each job to the subsystem 16, and interfaces with marker 18 to exercise some control over the hardware in printing apparatus 12, such as staplers, output trays, and feeders.

The subsystem 16 is responsible for taking image data in a PDL and for generating the decomposed image data to be printed on the printing apparatus 12. The subsystem 16 includes a plurality of independently-operating RIP nodes generally indicated as 30, and specifically divided into independent RIP nodes 30A, 30B, 30C. For purposes of this description, the PDLs discussed in the present embodiment can be generalized into plural "image formats," such image formats including not only PDLs but also other image and information formats such as, but not limited to, PDF, HP-PCL, and facsimile formats.

To enable parallel processing of page images from the RIP nodes 30, there is provided a supervisor 32, an output section 34, and a splitter 36. The function of splitter 36 is to direct the image data from an incoming job ultimately submitted from client 10 and distribute it to the various RIP nodes 30. These services will ultimately divide the data for the multi-page document into component subsets of data, each subset of data corresponding to one chunk to be printed.

A data queuing capability is carried out by the subsystem 16 in coordination with a buffer manager 40. Buffer manager 40 interacts with the subsystem 16 and a memory indicated as 42. As is familiar in the art of network printing, it is typically necessary to provide such a memory 42 to temporarily retain decomposed page image data emerging from one of the decomposers, until such time as the data for the particular page image is required by marker 18 for immediate submission to printing apparatus 12.

An embodiment of an improved printing system may be constructed to include a spooling system that provides jobs to a parallel RIP subsystem, wherein the parallel RIP subsystem includes a splitter that breaks jobs into chunks on pace boundaries, possibly containing more than one page per chunk; plural RIP nodes 30 that operate in parallel to convert the chunks to print-ready format; supervisory functionality that provides intelligent scheduling of the plural RIP nodes 30; and an output section to provide the appearance of fast serial operation to the rest of the system (i.e., although chunks may be processed to completion according to a re-ordered sequence, they are reported as finished in order). The plural RIP nodes 30 compress the print-ready pages to reduce downstream bandwidth requirements. For example, in certain implementations, such compression may employ compression according to the XM2 protocol.

The system may be implemented in symmetric multiprocessor (SMP) or in distributed multiprocessor configurations. In either configuration, a key feature is virtual disk (VDISK) 38, which is used for temporary storage, both of split chunks and print-ready pages. VDISK is similar to RAM disk with some specific features designed for performance in the contemplated chunk parallel system.

The subsystem 16 includes a language identifier that selects the method by which the print job is split into chunks. For languages that permit it, the chunk size may be determined by certain criteria such as an estimate of the amount of processing required for the composition. The trade-off between small chunks that offer reduced job time, and large chunks that offer improved throughput, is managed by job priority. In addition to the language identifier, the subsystem 16 preferably includes a splitter 36 for each language supported by the printing system. Accordingly, the RIP nodes are then capable of translating incoming PDLs to a print-ready form, which is preferably compressed.

An output section 34 includes a collector function that reorders chunk completion messages so that chunks appear to be completed in the same order they appeared in the original jobs. The supervisor 32 operates to estimate factors such as the time required to process a job. These factors may be based on statistics gathered as the splitting process is carried out; the splitter uses such information to load balance the processing carried out across the plurality of RIP nodes 30.

System architecture, control and data flow and processing steps may be understood with reference to FIG. 2, as follows.

When a job arrives from a client at job submission/printer management node 100, an input spooling system 202 saves the content either in memory or on disk 102, and the language is determined. Languages include, for example, PostScript, PDF, PPML, unstructured ASCII text, and others as needed.

The input spooling system 102 notifies a processing manager assembly for effecting the necessary supervisory functions (shown in FIG. 1 as facility object manager 120, job manager node 104, supervisor node 106 and task manager node 108), by indicating the language to job manager node 104. The job size (if it has been fully received), and how/where to find the data is also determined. Any of several well-known mechanisms may be used to communicate the location of the data, including a network filename for a distributed system, or a memory address for a centralized system.

The supervisor node 106 selects a splitter 110 using the determined language to select which splitter(s) is/are capable of splitting the job. A plurality of splitters is intended in a large system, in which case the supervisory function selects a splitter based on the estimated amount of pending work on all splitters' queues. The supervisor 106 also notifies the collector 112 that a new job exists in the system, and tells the spooling system 102 what the unique identifier for the new job is within the system. The supervisor node 106 generates unique identifiers so that it may communicate with multiple input spool systems without having their unique identifiers conflict.

The supervisor node 106 then informs the selected splitter 10 where to find the data (the supervisor does not look at the data), and the splitter 110 may begin splitting the file as soon as it is ready. The splitter 110 is multithreaded, so it can receive messages describing input jobs while it is splitting previous jobs. The supervisory function also informs the splitter 110 of the chunk parameters comprising the defining threshold boundaries of a chunk (maximum page count, maximum byte count).

The splitter 110 requests chunk destinations. The supervisor assigns chunks to RIP nodes implementing a Common Decomposer Facility ("CDF") 113 using estimates of the amount of work pending on the nodes. Because each different PDL RIP has different startup arguments and commands, the CDF may be designed to provide a single uniform interface back to the upstream (task scheduling) portions of the system so that the facilities manager does not have to understand each of the unique PDL command requirements. Thus, the CDF receives data that tells it the PDL type, whether one or multiple RIP processes need to be restarted, and the CDF also handles all of the tasks involved with restarting the particular RIP process, which will provide the translation from PDL to print-ready form. Estimates are calculated based on the total amount of work assigned to a physical RIP processor, as a given physical node may have both one or more RIPs and a splitter running on them. The supervisor node 106 only provides a small number (such as 3) of destinations to the splitter 110 to allow it to optimize its estimation of the amount of work assigned to each physical processor.

The splitter 110 splits the job into chunks. At each page boundary the splitter 110 checks to see whether the page count or byte count has been exceeded, and if either one has, it finishes that chunk. As it splits a job into chunks, it sends the chunk to the next destination it has received from the supervisor node 106. It writes the chunk into either memory or the disk associated with the node that the destination assigned by the supervisor indicates. The splitter 110 uses a separate thread to copy the data to a RIP node, so that it can continue splitting without being limited by network transfer time or the speed of the receiving node.

After the splitter 10 writes the first page of a chunk, it notifies the supervisor node 106, which, in turn, notifies a RIP node, and the collector 112. The collector maintains a set of jobs in the system, and for each job, a list of chunks in order of arrival.

A RIP node has multiple threads or processes, one of which handles the receiving end of the data transfer. The splitter 10 and the RIP nodes 13 use some means of communicating, such as by sending a separate message, whether or not the splitter 10 has completed writing that chunk. Alternatively, the supervisor node 106 could send a message to the RIP nodes 113 when it receives notification from the splitter 10. When a RIP node attempts to read beyond the end of the data written thus far, it blocks. If it attempts to read beyond the end of data written when the splitter 110 has finished the chunk, it receives an end of file signal.

In a page (or chunk) parallel RIP system, a document print job comprises a preamble containing content used in one or more subsequent pages and a body containing content specific to individual pages. Depending on the language, the content common to multiple pages might be at the start of the document, or it might, in the case of PDF, be stored at a number of readily located places throughout the document. The document print job is divided into its preamble and at least one chunk, a chunk containing page-specific content, which is transmitted to one or more RIP nodes.

In a parallel RIP system processing PostScript, the jobs are split into chunks by the splitter. Multiple PostScript interpreter processes running on the system independently RIP the chunks and return rasterized images to be printed for the pages within each chunk. Each chunk produced by the splitter contains a replicate of the PostScript preamble, in normally the first portion of the job file, followed by the portion of the job file corresponding to the relevant pages for the chunk. A more detailed description of a page (chunk) parallel RIP system can be found in U.S. Pat. No. 7,161,705, the disclosure of which is hereby incorporated herein in its entirety.

Normally, the PostScript job preamble is small (a few Megabytes of font or macro definitions). However, when the job preamble is very large (for example, 50 MB, 100 MB, or 200 MB), the chunks produced by the splitter may contain very little beyond the preamble. Parallel RIP performance in such circumstances can be greatly reduced as a result of the additional work required to copy and process the huge preamble to be attached to each chunk. In the worst case scenario, the parallel RIP system may crash due to lack of disk space for long jobs. This can happen, for example, when many large chunks are split ahead of time and queued to disk, waiting for a PostScript interpreter instance to become available to process the chunks.

One disclosed aspect of the embodiments is that the splitter 110 maintains a collection of RIP node addresses to which chunks of the job currently being split have already been sent. When a new chunk is about to be sent, the splitter 110 checks whether the RIP node address has already received a chunk, and if not, it sends the preamble, as well as the chunk. If the RIP node address has received a chunk of the current job, the splitter 110 only sends the portion of the chunk after the preamble. When the splitter 10 sends a portion of the job without its corresponding preamble, the splitter 110 communicates the location of the preamble to the RIP that is designated to receive it. This may be explicit, or implicit through a file naming convention. The collector 112 then maintains a collection of RIP node addresses to which chunks of each job being RIPped have been sent. When a job completes, the collector 112 triggers the removal of the corresponding preamble.

Other aspects of the embodiments enable the splitter 110 to make small changes to the preamble during the course of a job. This allows it to append recognized common objects as they are found. When the splitter 110 makes small changes to the preamble, all the preambles already stored on various nodes become invalid. As a result, more than one preamble may be sent to a node for a given job. As a further result, the process of removing preambles may remove all preambles belonging to that job.

One way of communicating the preamble location is by a file naming convention. The splitter 110 communicates the complete preamble location to the RIP, but it can implicitly communicate it to the collector 112 by a naming convention based on the job ID.

The collector 112 can either remove the preamble itself, or it may send a message to one RIP process on each node with instructions. Alternatively, it could send a message to every RIP, and all RIPs could attempt to delete any preambles they could; some might fail, but ignore the failure. In either case, whichever process removes the preambles needs to enumerate all preambles with names corresponding to that job ID.

Substantial performance improvements can result from the reduced data transfer and the risk of disk overflow can be substantially reduced by not distributing lengthy preambles with each chunk. However, even further performance gain can be achieved by not allowing the RIP to reinterpret the preamble, as long as it remains unchanged. The interface between the RIP and the file system is already isolated, so that different file systems could be substituted. This is what makes the Virtual Disk file system (described in detail below) relatively easy to integrate. In the layer of code that serves as the interface to the input, some modifications could make it possible to allow the RIP to maintain context.

When the subsystem supplying the interface between the RIP and the file system reaches the end of a chunk, the interface layer would check to see whether the next chunk has the same preamble (this information would be contained in a message it parses). If the preamble is the same, it would not signal end of file to the RIP, but instead begin reading from the next chunk (which does not have the preamble). When the last page of a chunk completes, the chunk complete message would be set to the collector 112, even though the RIP would be unaware of a chunk transition boundary. The interface layer would handle this seamlessly. If the preamble changes, the interface layer would signal end of file to the RIP and transmit the new preamble.

In a preferred embodiment data transfer uses an intermediary process, called VDISK (for virtual disk), which appears to both the sending and receiving processes like a regular disk, with the ability to open files and directories, read and write files, etc. Unlike a regular disk, however, VDISK provides the functionality that it may include a remote transfer (if the receiving process is on another node in a networked system), and because it knows whether the sending process has "closed" the file, it knows whether the receiving process should receive an end of file signal or be blocked on an attempt to read beyond the last data written. VDISK is implemented by a process providing a shared-memory interface for the receiving process, for local accesses. The VDISK implementation provides for more data being written to VDISK than fits into memory by paging out blocks of data in a most-recently-used order, because the least recently used (written) pages will be needed (read) soonest. Other than providing a transparent networked file system interface, blocking reads before end of file, and most-recently-used paging, VDISK operates much like a conventional RAM disk.

When the splitter 110 completes a chunk it sends a message to the supervisor informing it of which pages have been written; the supervisor informs 220 the collector of which pages to associate with a given chunk.

After the splitter 110 has written several chunks, multiple RIP nodes 113 operate in parallel, writing pages of print ready data. Preferably this data is written in compressed form, such as mixed raster content files, to internal memory data buffers (such as provided by VDISK).

As a RIP node completes a chunk, it sends a message to the supervisor, which passes the message on to the collector 112. The collector notes that this chunk is complete, and as long as it finds the first in the list for this job is complete, it removes the first in the list, and informs the supervisor node 106. The supervisor node 106 notifies the input spooling system of the location of the output data for that chunk.

When the splitter 10 completes a job, it informs the supervisor node 106, which informs the collector 112 to expect no more new chunks for that job.

When the collector 117 receives the last message from the supervisor that a RIP node has completed a chunk, it knows it because that job has an associated end-of-job message, and the list of chunks becomes empty when that chunk is removed from the list. The collector 112 then informs the supervisor node 106, which informs the input spooling system that the job is complete.

The compressed output pages for the completed output job are returned to printer management 100 for transmission to a print engine.

Parallelism is enhanced by the system architecture in that several of the processing nodes of FIG. 2 are intended to be multiple nodes acting in parallel. More particularly, such parallel processing nodes include job submission/printer management 100, job manager 104, task manager 108, splitter 110 and CDF 113.

Chunk size is optimized to trade off individual job speed against throughput. The time that a RIP node requires to process a chunk includes a small constant amount of startup time, as well as time that is generally proportional to the amount of data and complexity of the data in the chunk. The constant of proportionality relating the amount of data to the processing time varies with the kind of document or documents being processed and the amount of image/text data on any particular page. If every chunk is one page long, the startup time is spent on every page, and the total processing time will include N times the startup time plus the time it takes to process all the pages. In a serial system the total processing time would be simply the startup time plus the time it takes to process all the pages. Clearly the throughput of the parallel system would be better with larger chunks. To the contrary, if jobs are broken into very large chunks, the startup cost becomes negligible; however the chunks of any given job are likely to occupy only some of the RIP nodes. If there is only one job in the system, the remaining nodes are left idle. Even if there are multiple jobs in the system, the time between submission and completion of any one job is longer because the work is not well balanced across nodes. Considering the extreme case where chunks are as large as the jobs themselves, it is obvious that the time an individual job spends in the system is no faster than in a serial system, and in the extreme case, can actually be much slower than the serial case because of the extra overhead of repeatedly reading/writing/processing the large preamble within each chunk.

Pages to be processed span a range of complexity. On typical systems, there is a factor of 20 or more between the processing time of the easiest pages and the hardest pages. The simplest predictor of page processing time is the number of bytes in a page. If the page is a hard page, the startup overhead for that page is very small compared to the total time spent on that page. If the page is an easy page, the startup overhead may be considerable compared to the time spent on that page. For this reason, the criterion for determining chunk size takes into account both total bytes and total page count. Easy pages are grouped together to make chunks that are large enough to keep the startup overhead down, but small enough to spread the job over multiple RIP nodes. Short, easy jobs may not be spread over multiple RIP nodes, but since they are short and easy, there is no need to accelerate them further.

For each type of input, splitting may be performed in a unique manner. One example is PDF, which comes in the form of a file containing multiple objects, along with a cross reference table indicating the locations of the objects. One type of object is the stream object, which contains all of the marking information—information pertaining to putting marks on paper. Another type is the indirect reference object, which is the equivalent of a pointer. Yet another is a dictionary, which provides a set of key-value pairs. By examining the information contained in a special dictionary along with the information in the cross reference table, it is straightforward to find all of the objects in a file associated with each of its pages, and write out a separate PDF file for each of the pages. In a preferred embodiment, the splitter 110 calculates some statistical information such as the sizes of the streams for each page, and passes that information to the supervisor for use in estimating the work associated with that page.

Another example is DSC-PS, Document Structuring Convention conformant PostScript. This format contains information needed for all pages at the beginning of a file, and then information specific to each individual page, in sequence thereafter. Some creation tools, such as QuarkXpress, mix information needed for later pages where only information specific to an individual page should appear, however it is possible to divide it into individual pages. Any splitter 110 that can split a document into individual pages can readily concatenate several pages rather than using only one page per chunk, assuming it accepts an input format that supports multiple pages.

Some languages, such as database-mode VIPP (Variable Information Postscript Printware), are not readily split on page boundaries. In this case, a series of records comprise a job, and each record describes a single document, which may be several pages long. Typically this is intended for mass customized mailing, and each document within a job is intended to go in a separate envelope. For such a language, the splitter 110 would divide the job at document boundaries.

Figure 5:
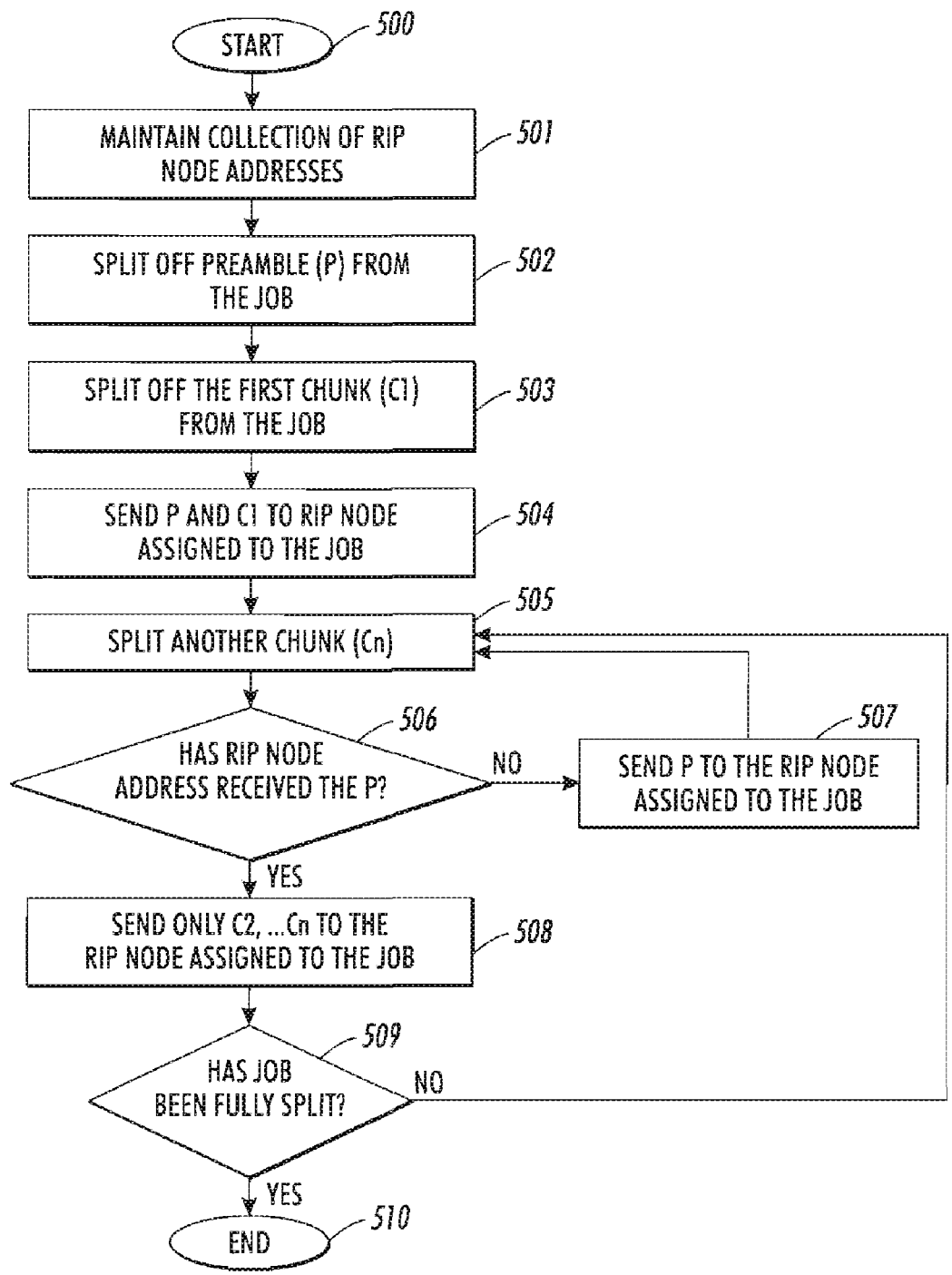
FIG. 5 is a flowchart summarizing a method for processing a print job in accordance with the embodiments.

FIG. 5 is a flowchart summarizing a method for processing a print job in accordance with the disclosed feature of the embodiments.

At step 500, the process starts and a print job is sent to the splitter for processing. At step 501, the splitter maintains a collection of RIP node addresses even before chunks and preambles of the print job are sent. At step 502, the splitter splits off the preamble from the job. At step 503, the splitter splits off the first chunk from job. At step 504, the splitter sends the preamble and the first chunk split to the RIP node assigned to the job. At step 505, the splitter splits off another chunk from the job. At step 506, the splitter checks whether the RIP node address has received the preamble for the chunk that has just been split. If the splitter determines that the RIP node address has not received the preamble for the chunk that has just been split, the process goes to step 507. However, if the splitter determines that the RIP node has received the preamble for the chunk, the process goes to step 508. At step 507, after it has been determined that the RIP node address has not received the preamble, the splitter sends the preamble to the RIP node assigned to the chunk and the process continues to step 505 to split off another chunk from the job, as described above. At step 508, after it has been determined that the RIP node address has received the preamble, the splitter sends only the chunk that has been split to the RIP node assigned to the job. At step 509, the splitter determines whether or not the job has been fully split. If the splitter determines that the job has not been fully split, the process goes to step 505 where another chunk is split off from the job. If however, the splitter determines that the job has been fully split, the process ends at step 510.

In addition to DSC-PS, there are other page description languages containing readily identifiable common content, and page-unique content. These include Adobe PDF, and various formats used for Variable Data Printing, such as VIPP. An alternative embodiment addresses these languages, in which the common content is not contained in a single block at the start of the file. In this alternative embodiment, a linking process is interposed between each RIP and the virtual file system. This process receives chunks as two segments. In the first segment are referenced objects needed in this chunk and possibly in subsequent chunks. In the second segment are page or chunk-specific instructions for using referenced objects, and other page-unique content. The splitter identifies referenced objects, and tracks which referenced objects have been transmitted to which physical RIP nodes. It then transmits any new referenced objects to RIP nodes as they require them, and uses referenced object identifiers to indicate to the RIP node where the referenced objects are. The linking process maintains a cache of referenced objects, adding newly received referenced object segments to the cache. The linking process, further translates references in the page-specific portion to the actual references in the cache, thereby creating what appears to the RIP to be a normal, complete document.

It will be appreciated that various of the above-disclosed and other features and functions, or alternatives thereof may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for processing a print job file in a parallel RIP system including a plurality of RIP nodes comprising:
   identifying common content in &print job file;
   splitting a remainder of the print job file into chunks;
   sending the chunks of the print job file to a plurality of RIP nodes for processing;
   determining whether an individual RIP node of the plurality of RIP nodes has already received any chunk from the print job file; and
   separately sending the common content of the print job file to the individual RIP node assigned to a current chunk only when it is determined that the individual RIP node has not already received any chunk from the print job file,
   wherein the common content is a preamble, and
   the method further comprises communicating to the individual RIP node that the chunk to follow should be pre-pended with the preamble.

2. The method as defined in claim 1, further comprising completely removing the preamble from the plurality of the RIP nodes upon completing the processing of the print job file.

3. The method as defined in claim 2, wherein the completely removing the preamble includes maintaining a collection of individual RIP node addresses to which the chunks of the print job file have been sent and referring to the collection of individual RIP node addresses during the completely removing.

4. The method as defined in claim 1, further comprising reading the preamble only once and treating subsequent chunks that follow the preamble as if they were concatenated segments of the print job file.

5. The method as defined in claim 1, further comprising writing the chunks to a virtual disk associated with the individual RIP node,
   wherein the virtual disk is a combination of memory and hard disk backing store.
6. The method as defined in claim 5, further comprising reading the chunks from the virtual disk;
   checking whether a next chunk has a same preamble as the current chunk being processed;
   when the preamble of the next chunk is the same, an end of file signal will not be sent to the individual RIP node, and reading of the next chunk will commence; and
   when the preamble of the next chunk is not the same, an end of file signal will be sent to the individual RIP node, and a new preamble will be transmitted to the individual RIP node.
7. A parallel RIP system comprising:
   a plurality of RIP nodes on at least one physical network-connected computer for parallel processing of a print job into a printer-ready format for the printing of a print job file;
   a supervisor for maintaining low bandwidth connections to the other parts of the system and scheduling events;
   a job manager for communicating status information to the supervisor;
   a splitter for splitting the print job into a plurality of chunks, wherein the splitter
      identifies common content in a print job file, the common content being a preamble,
      splits a remainder of the print job file into chunks,
      sends the chunks of the print job file to a plurality of the plurality of RIP nodes for processing,
      determines whether an individual RIP node of the plurality of RIP nodes has already received any chunk from the print job file;
      separately sends the preamble to the individual RIP node assigned to a current chunk only when it is determined that the individual RIP node has not already received any chunk from the print job file, and
      communicates to the individual RIP node that the chunk to follow should be pre-pended with the preamble; and
   a collector for serializing chunk complete messages and maintaining a collection of node addresses to which chunks of the print job file have been sent so that triggering removal of the preamble from the plurality of RIP nodes when the processing of the print job file is completes is possible.

8. The system as defined in claim 7, wherein the splitter completely removes the preamble from the plurality of RIP nodes upon completion of the processing.

9. The system as defined in claim 7, wherein the splitter reads the preamble only once and treats subsequent chunks that follow the preamble as if they were concatenated segments of the print job file.

10. The system as defined in claim 7, wherein the splitter writes a chunk to a virtual disk associated with the individual RIP node, and virtual disk is a combination of memory and hard disk backing store.

11. The system as defined in claim 10, wherein the splitter reads the chunks from the virtual disk,
   checks whether a next chunk has a same preamble as the current chunk being processed,
   when the preamble of the next chunk is the same, an end of file signal will not be sent to the individual RIP node, and reading of the next chunk will commence, and
   when the preamble of the next chunk is not the same, an end of file signal will be sent to the individual RIP node, and a new preamble will be transmitted to the individual RIP node.

12. The system as defined in claim 7, wherein the splitter receives the print job file directly from an input spool and receives splitting instructions from the supervisor.

13. The system as defined in claim 12, wherein the splitting instructions include instructions on where to send each chunk and each chunk size.

14. The system as defined in claim 7, wherein the individual RIP node receives messages from the supervisor informing the individual RIP node of the location of the chunks assigned to the individual RIP node, processes the chunks, and informs the supervisor when finished.

15. The system as defined in claim 7, wherein the splitter makes small changes to the common content during the course of splitting the print job file such that the splitter can append recognized common objects to the chunks as the recognized common objects are found.

16. The system as defined in claim 7, wherein the supervisor informs the collector when a chunk has been completely processed.

17. The system as defined in claim 7, wherein the collector reports to the supervisor when a series of pages has been completed.

* * * * *